J. B. THOMAS.
APPARATUS FOR APPLYING COUPLINGS.
APPLICATION FILED MAR. 29, 1915.

1,155,108.

Patented Sept. 28, 1915.
2 SHEETS—SHEET 2.

WITNESSES

INVENTOR
John B. Thomas
by his Attorney

UNITED STATES PATENT OFFICE.

JOHN B. THOMAS, OF LORAIN, OHIO, ASSIGNOR TO NATIONAL TUBE COMPANY, OF PITTSBURGH, PENNSYLVANIA, A CORPORATION OF NEW JERSEY.

APPARATUS FOR APPLYING COUPLINGS.

1,155,108.  Specification of Letters Patent.  Patented Sept. 28, 1915.

Application filed March 29, 1915. Serial No. 17,842.

*To all whom it may concern:*

Be it known that I, JOHN B. THOMAS, a citizen of the United States, and resident of Lorain, in the county of Lorain and State of Ohio, have invented certain new and useful Improvements in Apparatus for Applying Couplings, of which the following is a specification.

My invention relates to the art of manufacturing pipes or tubing and has particular reference to novel apparatus which may be used to apply couplings to the ends of threaded tubes.

It is customary, in the manufacture of tubing, to apply a coupling to one end of each tube. The practice heretofore has been to partially screw a coupling on the pipe, then to thread the other end of the coupling onto a threaded plug which plug is held and rotated by a machine of some sort and the pipe held against rotation. Thus, when the coupling was screwed on the plug so that the end of the coupling came in contact with the flange of said plug, the coupling rotated with the plug and thereby located the coupling on the pipe. Thereafter the machine would necessarily be reversed and the threaded plug screwed out of the coupling.

My invention contemplates apparatus by means of which the operations heretofore carried out may be performed in a much shorter space of time, due to the fact that the plug which holds the coupling member is made in segments and may be collapsed, both when associating the same with the coupling and removing the same therefrom.

The invention will be more readily understood by reference to the accompanying drawings, wherein—

Figure 1:
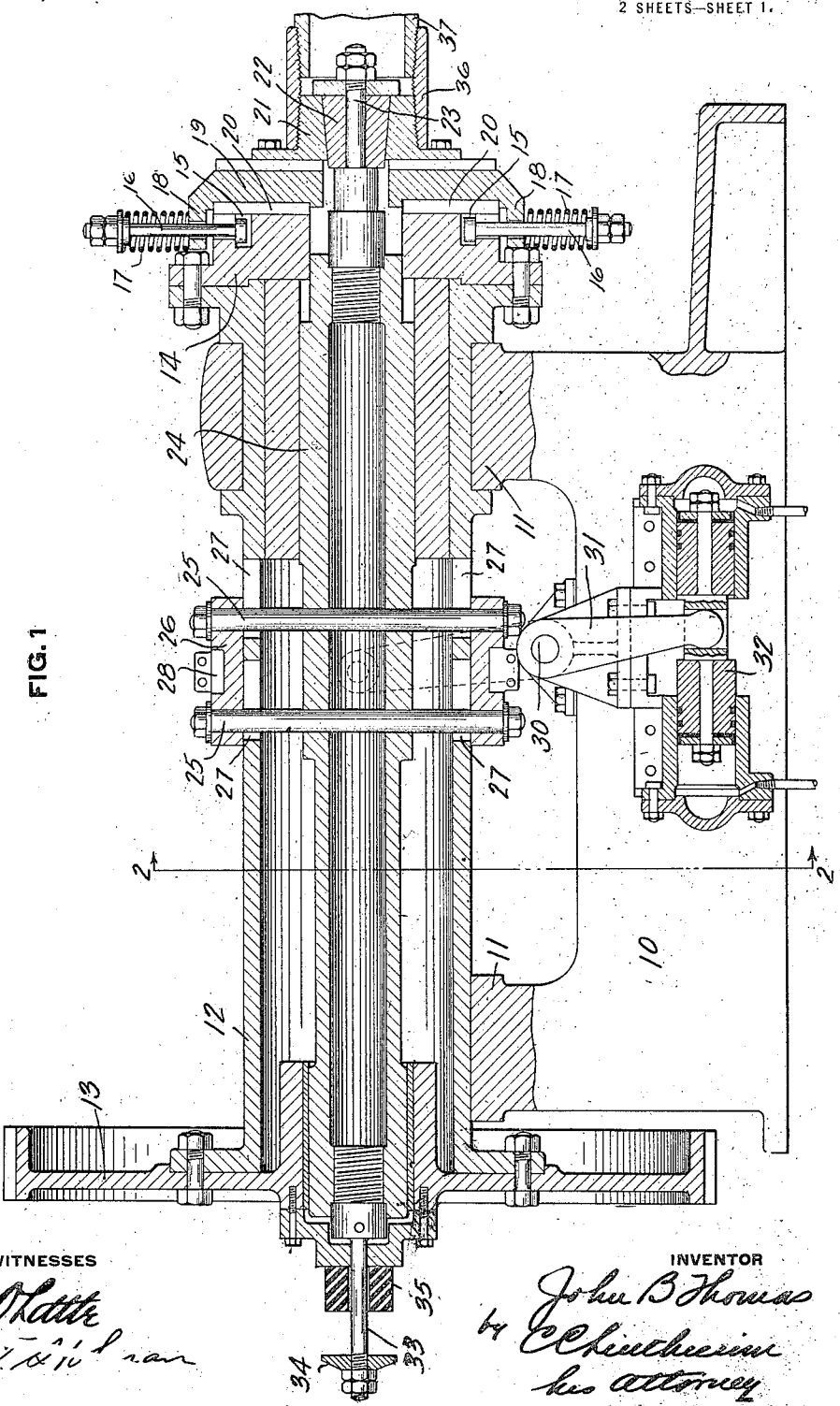
Figure 2:
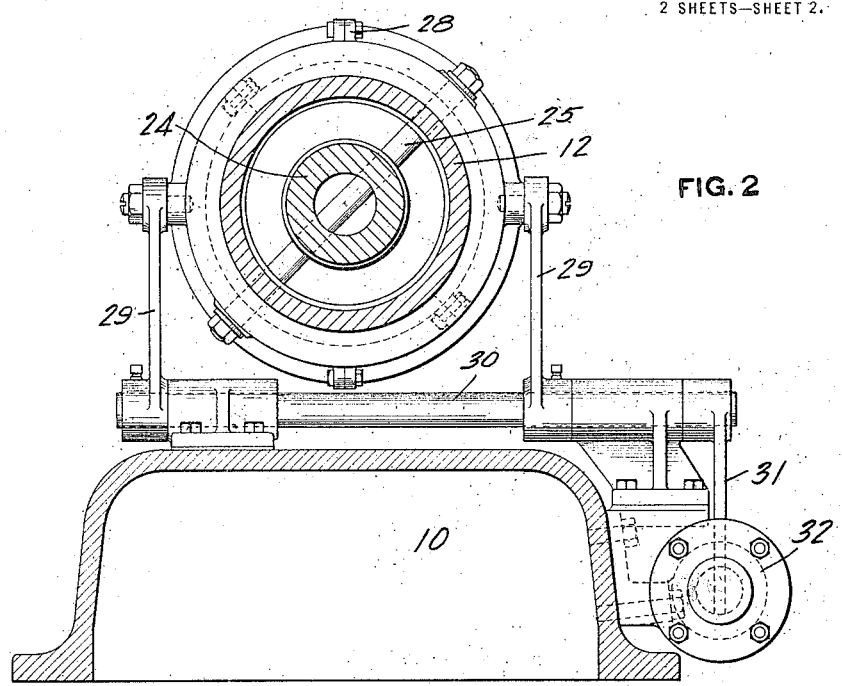
Figure 3:
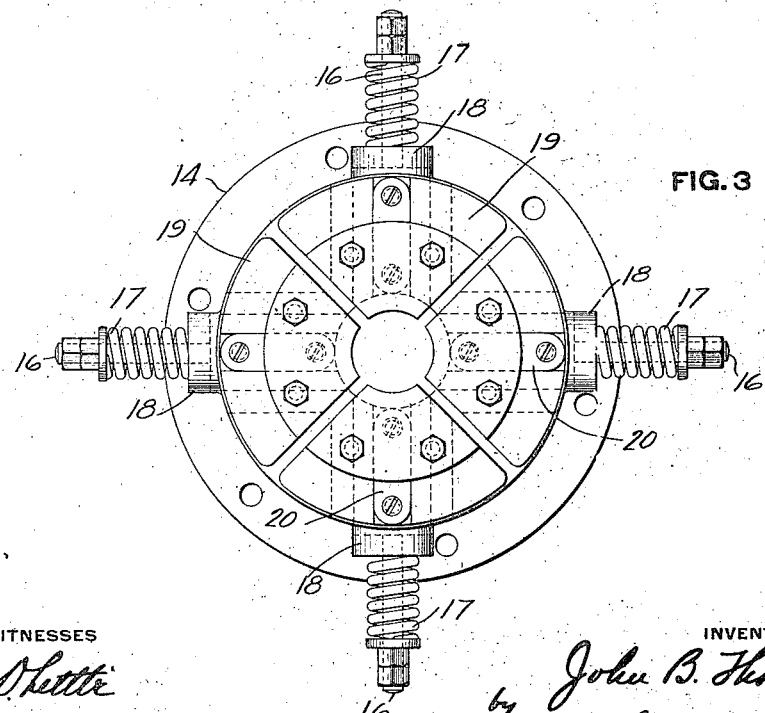

Figure 1 is a longitudinal section through a machine constructed in accordance with my invention, the parts being shown in the position they will assume when the coupling has been suitably located upon a threaded end of a tube, Fig. 2 is a section on the line 2—2 of Fig. 1, and Fig. 3 is a face view of the segments which carry the segmental plug.

Referring more particularly to the drawings, it will be seen that a base 10 is provided with housings 11 on which the rotatable shaft, or cylinder 12 is mounted. To the flanged end of the cylinder 12 is secured a gear 13, which gear is driven by a suitable prime mover, not shown. On the opposite end of the cylinder is mounted a face plate 14, having equally spaced notches 15 therein which accommodate the heads of bolts 16. Springs 17 are carried by the bolts, the springs acting upon lugs 18 integral with segments 19, best shown in Fig. 3. Guides 20 are provided on the segments and the face plate 14 for the purpose of securing a true radial movement of the segments. Rigidly secured to the face of each segment 19 is a segment 21, the segments together forming a circular plug having a threaded periphery. The springs 17 tend to force the parts, including the segments of the plug, toward each other. As a means for spreading or forcing outwardly the plug segments, I provide the conical wedge 22, which is secured by a bolt 23 to a reciprocable plunger 24, this plunger being mounted within the cylinder 12 and rotatable therewith, but independently longitudinally movable. This longitudinal movement is secured by passing through the cylinder 24 a pair of bolts or pins 25, the outer ends of which engage a grooved collar 26. The bolts pass through slots 27 formed in the cylinder 12, and, therefore, have limited freedom of movement longitudinally. Within the groove in the collar 26 I mount a yoke strap 28, to which is connected the cranks 29, mounted on shaft 30, which shaft is movable through the crank 31 by a fluid pressure piston 32. The rear end of the plunger 24 is slidably mounted in the axis of the gear 13. A bolt 33 projects outwardly from the end of the plunger and carries a washer 34 which is adapted to coöperate with a block 35 of rubber or similar resilient material.

The operation of the device is as follows: When a coupling is to be applied to the end of the tube the wedge member 22 is thrust forwardly, thus contracting the diameter of the plug 21. A coupling 36 which has been loosely threaded by hand on the end of the tube 37 is then slipped over the end of the plug and abutted against the rear flange formed thereon. Fluid pressure is then exerted upon the piston 32 which causes the retraction of the conical wedge 22 and the engagement of the threads of the plug with the threads of the coupling. The parts are then started in operation with the tube 37 held against rotation. The coupling is then quickly screwed into rigid engagement with the tube, whereupon the piston 32 is actuated in an opposite direction to force the conical member 22 forwardly. The springs 17 thereupon force the segments of the plug inwardly and release the coupling therefrom.

By the use of the construction the operations may be carried on without loss of time, inasmuch as no reversal of movement of any of the parts is required.

Obviously many modifications may be made in the construction shown within the scope of the appended claims.

I claim:

1. In a device of the class described, the combination of a rotatable member, a segmental plug carried on said rotatable member, a wedge for spreading the segments of said plug, said wedge being rotatable with and longitudinally movable relative to said rotatable member and means for preventing a relative rotation of the wedge and rotatable member, substantially as described.

2. In a device of the class described, the combination of a rotatable cylinder, a segmental plug carried at one end of said cylinder, a longitudinally reciprocable plunger for positively expanding the segments of the plug, and means for rotating said cylinder and said plunger in unison, substantially as described.

3. In a device of the class described, the combination of a cylinder, mechanical means for rotating said cylinder, a plurality of segments carried at one end of the cylinder, said segments being adapted to engage the interior of a pipe coupling, positive means for expanding said segments, said means including a longitudinally movable plunger, and means for rotating said plunger in unison with said cylinder, substantially as described.

4. In a device of the class described, the combination of an outer hollow shaft, a plurality of segments mounted on the end of said shaft, spring means for forcing said segments inwardly, positive means for forcing the segments outwardly against the force to said springs, said positive means including a longitudinally reciprocable inner shaft, and means for rotating said outer and inner shafts in unison, substantially as described.

Signed at Lorain, Ohio, this 24th day of March, 1915.

JOHN B. THOMAS.

Witnesses:
CHAS. FELL,
ARTHUR R. GRABER.